(12) United States Patent
Zachmann

(10) Patent No.: US 8,397,048 B2
(45) Date of Patent: Mar. 12, 2013

(54) MEMORY LEAK DETECTION DURING DYNAMIC MEMORY ALLOCATION

(75) Inventor: Guenter Zachmann, Walldorf (DE)

(73) Assignee: SAP AG, Walldorf (DE)

( * ) Notice: Subject to any disclaimer, the term of this patent is extended or adjusted under 35 U.S.C. 154(b) by 571 days.

(21) Appl. No.: 12/636,603

(22) Filed: Dec. 11, 2009

(65) Prior Publication Data

US 2011/0145536 A1    Jun. 16, 2011

(51) Int. Cl.
*G06F 12/00* (2006.01)
(52) U.S. Cl. .......................... 711/171; 711/156; 711/170
(58) Field of Classification Search .................. None
See application file for complete search history.

(56) References Cited

U.S. PATENT DOCUMENTS

2005/0235127 A1* 10/2005 Muthiah et al. ............... 711/170
2008/0222450 A1    9/2008 Yang

OTHER PUBLICATIONS

"Dmalloc-Debug Malloc Library", [Online] Retrieved from the Internet: <URL: http://dmalloc.com/>, (Accessed Nov. 2, 2009), 1 pg.

"mpatrol", [Online] Retrieved from the Internet: <URL: http://mpatrol.sourceforge.net/>, (Accessed Nov. 2, 2009), 3 pgs.

Henry, Ethan, et al., "How Do You Plug Java Memory Leaks?", [Online] Retrieved from the Internet: <URL: http://www.ddj.com/java/184404011>, (Feb. 1, 2000), 9 pgs.

Murphy, Niall, "Assert Yourself", [Online] Retrieved from the Internet: <URL: http://www.netrino.com/Embedded-Systems/How-To/Define-Assert-Macro>, (Accessed Nov. 2, 2009), 6 pgs.

Murphy, Niall, "How to Allocate Dynamic Memory Safety", [Online] Retrieved from the Internet: <URL: http://www.netrino.com/Embedded-Systems/How-To/Malloc-Free-Dynamic-Memory-Allocation>, (Accessed Nov. 2, 2009), 9 pgs.

* cited by examiner

*Primary Examiner* — Shawn X Gu
(74) *Attorney, Agent, or Firm* — Schwegman Lundberg & Woessner, P.A.

(57) ABSTRACT

A method to detect memory leaks during dynamic memory allocation comprises generating statistical information regarding allocated chunks in a memory heap during a dynamic memory allocation process, with the statistical information including same-sized chunk information related to the number of allocated chunks being identical in size. The statistical information is monitored to identify a potential memory leak based at least in part on the same-sized chunk information, in response to which an alert signal is generated.

24 Claims, 9 Drawing Sheets

MEMORY LEAK DETECTION DURING DYNAMIC MEMORY ALLOCATION

TECHNICAL FIELD

The present application relates generally to the technical field of dynamic memory allocation to a memory heap and relates in particular to the detection of memory leaks during dynamic memory allocation.

BACKGROUND

Dynamic memory allocation, also known as heap-based memory allocation, is the allocation of memory storage for use in a computer program during the runtime of that program. It can also be seen as a way of distributing ownership of limited memory resources among many pieces of data and code. Dynamically allocated memory exists until it is freed. This is in contrast to static memory allocation, which has a fixed duration.

Usually, memory is allocated from a large pool of unused memory area called the heap (also called the free store). Since the precise location of the allocation is not known in advance, the memory is accessed indirectly, usually via a reference or pointer. For example, malloc is a library function for performing dynamic memory allocation in the C and C++ programming languages. It is typically part of a standard library for both languages.

A program or process accesses an allocated block or chunk of memory via a pointer returned by a memory allocation function such as malloc. A block or chunk of memory allocated in this manner is persistent in that it will remain allocated until the program terminates or the memory is explicitly deallocated, or "freed." This is typically achieved by the use of a free memory function.

When a call to malloc succeeds, the return value of the call should eventually be passed to the free memory function. This releases the allocated memory block or chunk in the heap, allowing it to be reused to satisfy other memory allocation requests. If a memory chunk is not freed, a memory leak will occur in that the allocated memory will not be released until the process exits, and in some environments, not even then. Such memory leaks are especially problematic in long-running systems, such as embedded systems.

BRIEF DESCRIPTION OF THE DRAWINGS

Some embodiments are illustrated by way of example and not limitation in the figures of the accompanying drawings in which.

DETAILED DESCRIPTION

Figure 1:
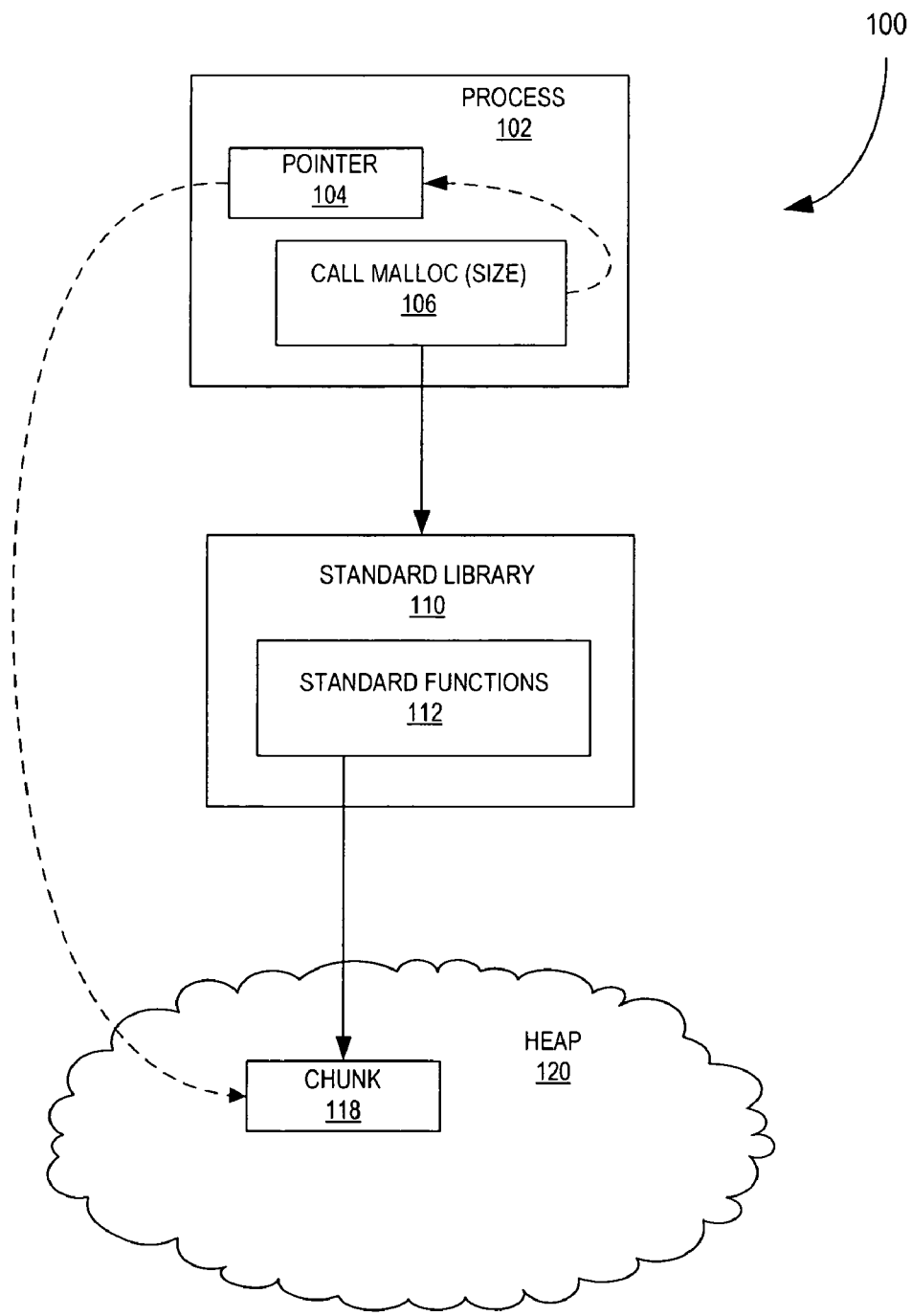
FIG. 1 is a schematic block diagram illustrating a prior art system for allocating memory chunks to a process from a memory heap.

Example methods and systems to detect memory leaks during dynamic memory allocation are described. In the following description, for purposes of explanation, numerous specific details are set forth in order to provide a thorough understanding of some example embodiments. It will be evident, however, to one skilled in the art that the method and system may be practiced without these specific details.

One embodiment provides a method comprising generating statistical information regarding allocated chunks in a memory heap during a dynamic memory allocation process, with the statistical information including same-sized chunk information related to the number of allocated chunks that are identical in size; monitoring the statistical information to identify a potential memory leak based at least in part on the same-sized chunk information; and generating an alert signal in response to the identification of a potential memory leak.

The statistical information may be generated by intercepting calls to standard functions between a process and a standard library. The method may, for example, include intercepting a standard memory allocation call, such as a call to malloc (size) in C/C++, from a process to the standard library, and recording a chunk descriptor indicative of a chunk size associated with the memory allocation call. Further, the method may include intercepting a standard free memory call, such as a call to free(address) in C/C++, and removing a previously recorded chunk descriptor associated with the free memory call. Same-sized chunk information may thus be compiled from the totality of recorded chunk descriptors.

The same-sized chunk information may comprise a chunk count which is indicative of the total number of allocated chunks of a particular size, the monitoring of the statistical information comprising tracking the chunk count over time, and identifying a potential leak based on the behavior over the chunk count over time.

Monitoring the statistical information may comprise providing a chunk count queue comprising a series of chunk count entries, and, at regular intervals, determining a current chunk count. If the current chunk count meets predetermined criteria, such as being greater than a head of the queue, the current chunk count is inserted at a head of the queue, and the remainder of the queue may be shifted towards a tail of the queue. In such case, the method may include monitoring the tail of the queue to identify a potential memory leak.

The chunk count queue may have a limited length, so that shifting of the queue results in production of a shift-out value at the tail of the queue, with the method further comprising incrementing a threshold counter in response to an increase in the shift-out value, and the alert signal being automatically generated when the threshold counter exceeds a threshold value. The threshold counter may be decremented in response to a decrease in the shift-out value.

The method may include compensating for oscillation of the chunk count over time by smoothing the chunk count queue (for example, by comparing the current chunk count to the head of the queue, and if the current chunk count is smaller than the head of the queue, setting each chunk count entry which is greater than the current chunk count equal to the current chunk count).

FIG. 1 shows an example prior art system 100 for allocating memory chunks in a memory heap during dynamic memory allocation. During execution of a programmatic process 102, which may form part of a larger program executed on the computer system 100, the process 102 may require allocation of memory from a memory heap 120 forming part of the system 100. The process 102 therefore requests memory allocation by issuing a memory allocation call 106. In this example, the memory allocation call is a standard C++ library function calling for memory allocation of a memory chunk or block having a particular size, thus being in the format: malloc(size).

The call to malloc 106 is made to a standard library 110. The standard library 110 includes standard functions 112. In this example, the standard library 110 is a C standard library identified as libc.sl. The standard library 110 is provided by an operating system of the computer system 100 and is loaded during process start-up. The standard functions 112 provided by the standard library 110 include the memory allocation function, malloc(size), and a free memory function, free(address).

In response to receiving the call to malloc 106, the standard memory allocation function is executed to allocate memory in the heap 120. A particular chunk 118 in the heap 120 is thus allocated to the process 102 as a result of the call to malloc 106. A pointer 104 is returned to the process 102, with the pointer 104 referencing the chunk 118, so that the process 102 can access the memory chunk 118.

Figure 2:
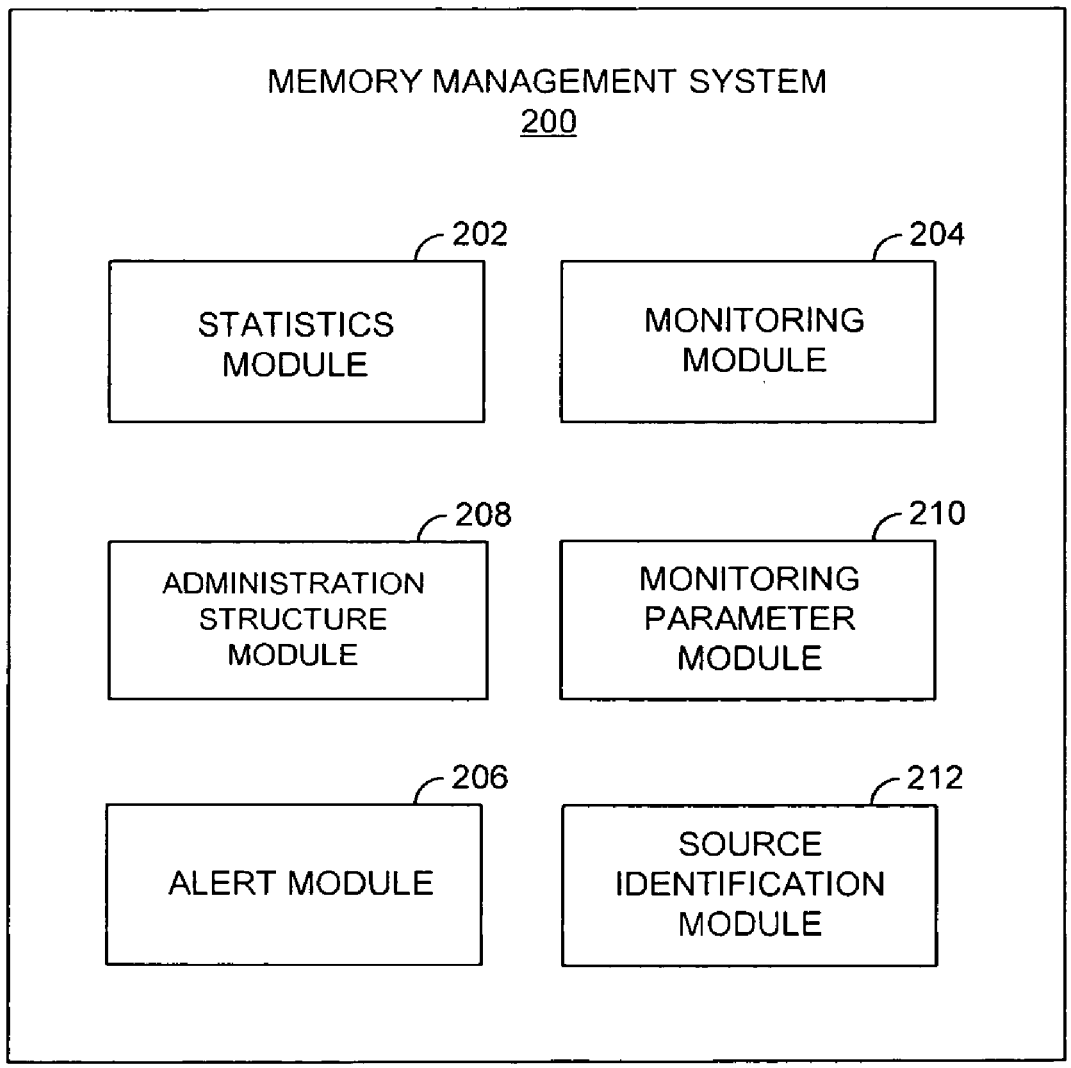
FIG. 2 is a schematic block diagram of a system to detect memory leaks in a dynamic memory allocation process, according to an example embodiment.

FIG. 2 shows an example embodiment of a system to detect memory leaks during dynamic memory allocation. The system illustrated in FIG. 2 is a memory management system 200, which may be in the form of a memory management application executed on a computer system. The memory management system 200 includes a statistics module 202 to gather and/or generate statistical information regarding chunks 118 allocated to the memory heap 120 (FIG. 1), in particular to generate same-sized chunk information indicative of the number of allocated chunks 118 which are identical in size. The system 200 further includes a monitoring module 204 to monitor the statistical information in order to identify potential memory leaks. A monitoring parameter module 210 provides a set of parameters, as described in more detail below, used by the monitoring module 204 to process the statistical information for leak identification. The monitoring parameter module 210 may provide for selective adjustment of the monitoring parameters by an administrator, and/or may, in some embodiments, provide for automatic dynamic adjustment of the monitoring parameters.

An administration structure module 208 is provided to load an administration structure to intercept memory function calls between the process 102 and the memory heap 120 (FIG. 1), thereby enabling the generation of statistical information by the statistics module based on the intercepted memory function calls.

The system 200 further includes an alert module 206 to generate an alert signal in response to identification of a potential memory leak, such as for creating and sending an alert message to a system administrator, for example. A source identification module 212 may serve to identify the origin of an identified potential memory leak. In an example embodiment, the source identification module 212 may generate information regarding chunk sizes associated with respective entries in a call stack. If a particular chunk sizes is identified as being associated with a memory leak, a call stack entry associated with the particular chunk size may be used to isolate a process causing the potential leak.

Figure 3:
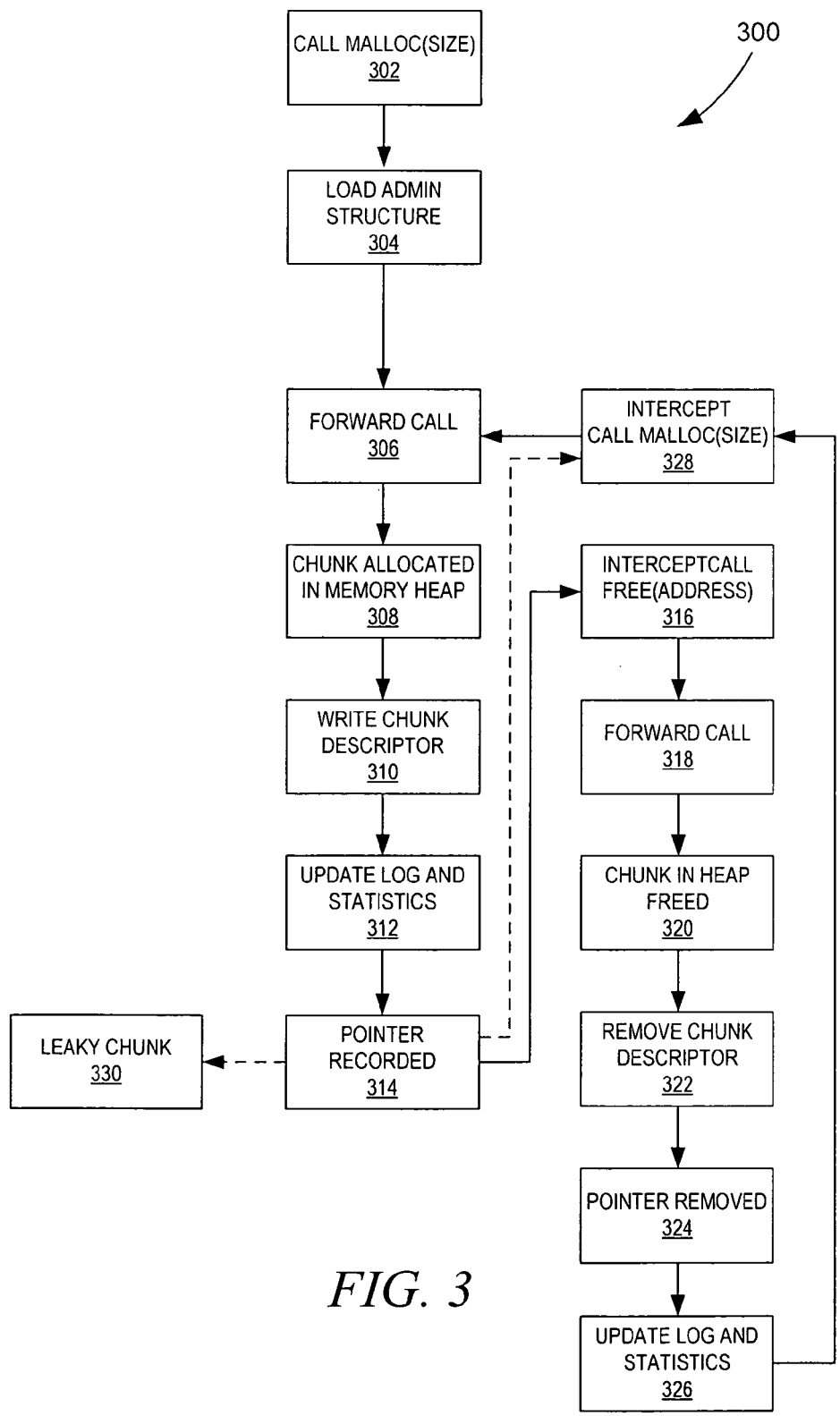
FIG. 3 is a schematic flow diagram of a method to generate and maintain statistical information regarding the size of memory chunks allocated during a dynamic memory allocation process, according to an example embodiment.
Figure 5:
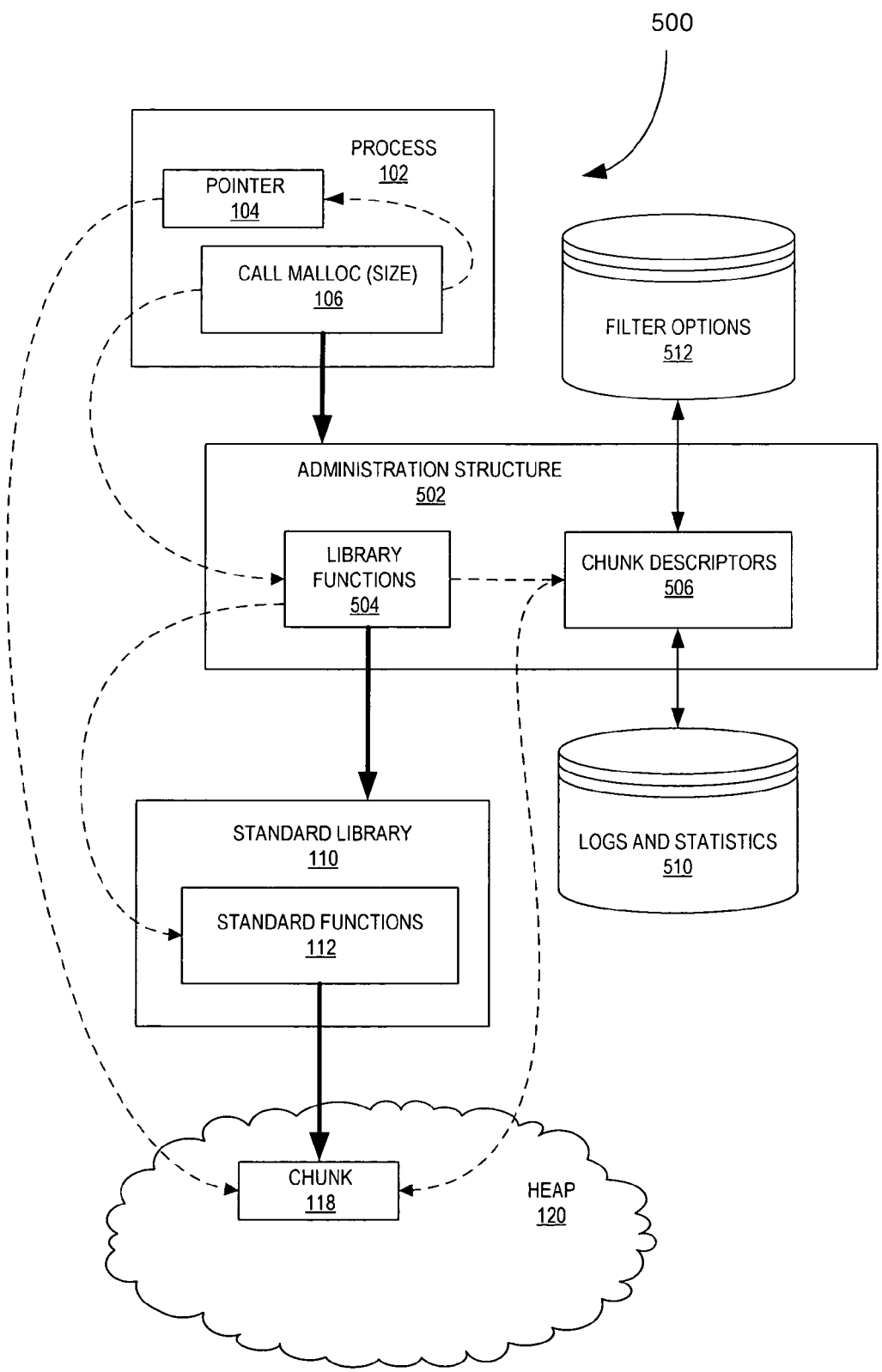
FIG. 5 is a schematic block diagram illustrating a system in which statistical information regarding allocated chunk-size is generated during execution of a memory allocation function in a dynamic memory allocation process, according to an example embodiment.
Figure 6:
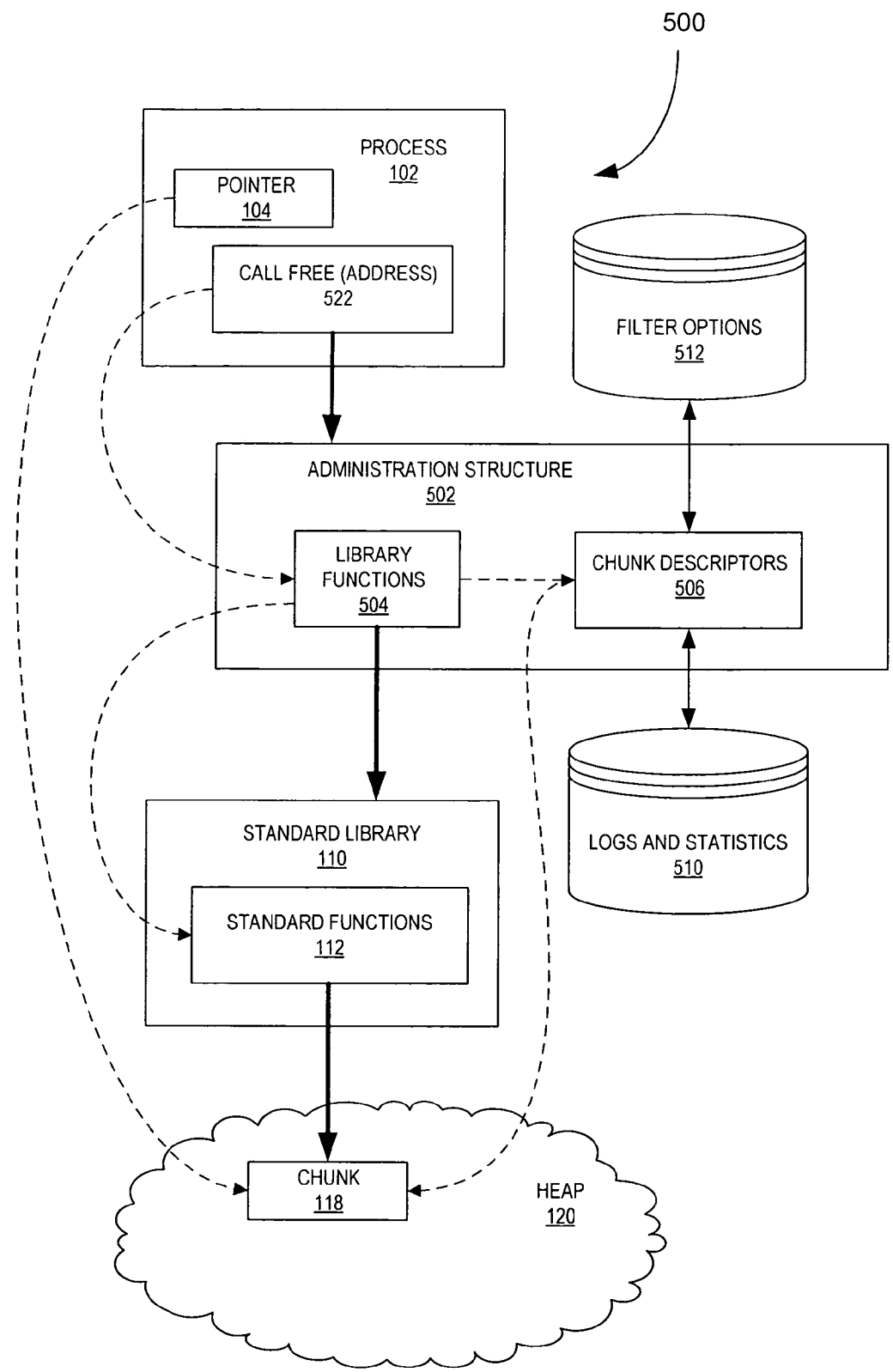
FIG. 6 is a schematic block diagram illustrating a system in which statistical information regarding allocated chunk size is generated and maintained during execution of a free memory function in a dynamic memory allocation, according to an example embodiment.

FIG. 3 shows a schematic flow diagram of an example method 300 performed by the system 200 of FIG. 2. The method 300 will be described below with reference to FIGS. 5-7, which show respective schematic configurations of a computer system 500 during execution of the method 300. The method 300 commences when a process 102 (FIG. 5) makes a first call to a heap operation, for example, calling to malloc 106, at block 302 (FIG. 3). In response to receiving the call for memory allocation, an administration library or administration structure 502 (FIG. 5) is automatically loaded, at block 304, by the administration structure module 208 (FIG. 2). The administration structure 502 is thus generally loaded or initialized during process start-up, and may be loaded as a first library, prior to loading of the standard library 110. The administration structure 502 is identified in this example as liballoc.sl. The administration structure 502 serves to intercept memory heap operations called by the process 102, permitting the generation of logs and statistics regarding such memory heap operations.

The operation of loading the administration structure 502 includes the preparation by the statistics module 202 (FIG. 2) of output logs and statistics in a memory or database 510 (FIG. 5), as well as the loading of monitoring parameters by the monitoring parameter module 210 from a management file or database containing filtering options 512. These monitoring parameters may include filter options regarding characteristics of allocated chunks in the heap 120 in respect of which management statistics are to be kept. For example, the filter options may specify that chunks of certain sizes are excluded from observation or monitoring. The monitoring parameters of the management database 512 may further include parameters for identifying a leak based on statistics gathered by the administration structure 502, for example, comprising a sample interval parameter, a chunk queue length parameter, and a threshold value parameter, as discussed in greater detail below.

The administration structure 502 includes library functions 504 corresponding to the standard functions 112, and in particular providing for at least a memory allocation function and a free memory function. During loading of the administration structure 502, access to the standard library 110 and its standard functions 112 is established, so that calls to heap operations intercepted by the administration structure 502 can be forwarded or relayed to the standard library 110, resulting in execution of the standard functions 112 in conventional fashion.

As illustrated in the flow chart 300 of FIG. 3, the call to malloc 106 intercepted by the administration structure 502 is forwarded to the standard library 110, at block 306. A corresponding chunk 118 in the heap 120 is consequently allocated to the process 102, at block 308. In response to allocation of the chunk 118, a chunk descriptor 506 (FIG. 5) is written or recorded in the administration structure 502, at block 310. The chunk descriptor 506 may include information about the size of the chunk 118 and the chunk address in the heap 120. Thereafter, the logs and statistics 510 (FIG. 5) are updated, at block 312. In particular, an entry may be written to a log to record particulars of the chunk allocation, and a chunk queue may be updated in accordance with a method further described below with reference to FIG. 4. The address of the allocated chunk 118 is then returned to the client process 102, at block 314, so that the process 102 records the pointer referencing the chunk 118.

In some embodiments, the memory administration structure 502 may serve to encapsulate the allocated chunk 118 with a prologue and an epilogue and/or guard pages protecting the allocated chunk 118. The prologue and epilogue may have known content, so that damage to the chunk 118 may be detected by the administration structure 502 by periodic performance of a content check of the prologue and the epilogue. The chunk descriptor 506 may, in such cases, include an address or reference of a prologue preceding the chunk 118, while the pointer 104 may reference the start point not of a memory block including the prologue, the chunk 118, and the epilogue, but of the chunk 118 itself.

If the allocated chunk 118 is later freed by a standard library free memory function, the chunk descriptor 506 is removed from the administration structure 502, and the logs and statistics 510 are updated, but if the pointer 104 is removed or overwritten without freeing of the chunk 118, a memory leak may occur. These situations are described below as part of the method 300 of FIG. 3, with reference to FIGS. 6 and 7.

When the process 102 issues a call to free the chunk 118, in the format call free(address) 522 (FIG. 6), the call to free the chunk 118 is intercepted by the administration structure 502, at block 316. The call is forwarded to the standard library 110, at block 318, as a result of which the chunk 118 in the heap 120 is freed, at block 320. The chunk descriptor 506 corresponding to the freed chunk 118 is removed from the administration structure 502, at block 322, and at block 324, the process 102 removes the pointer 104, and at block 326, the logs and statistics 510 are updated.

Figure 7:
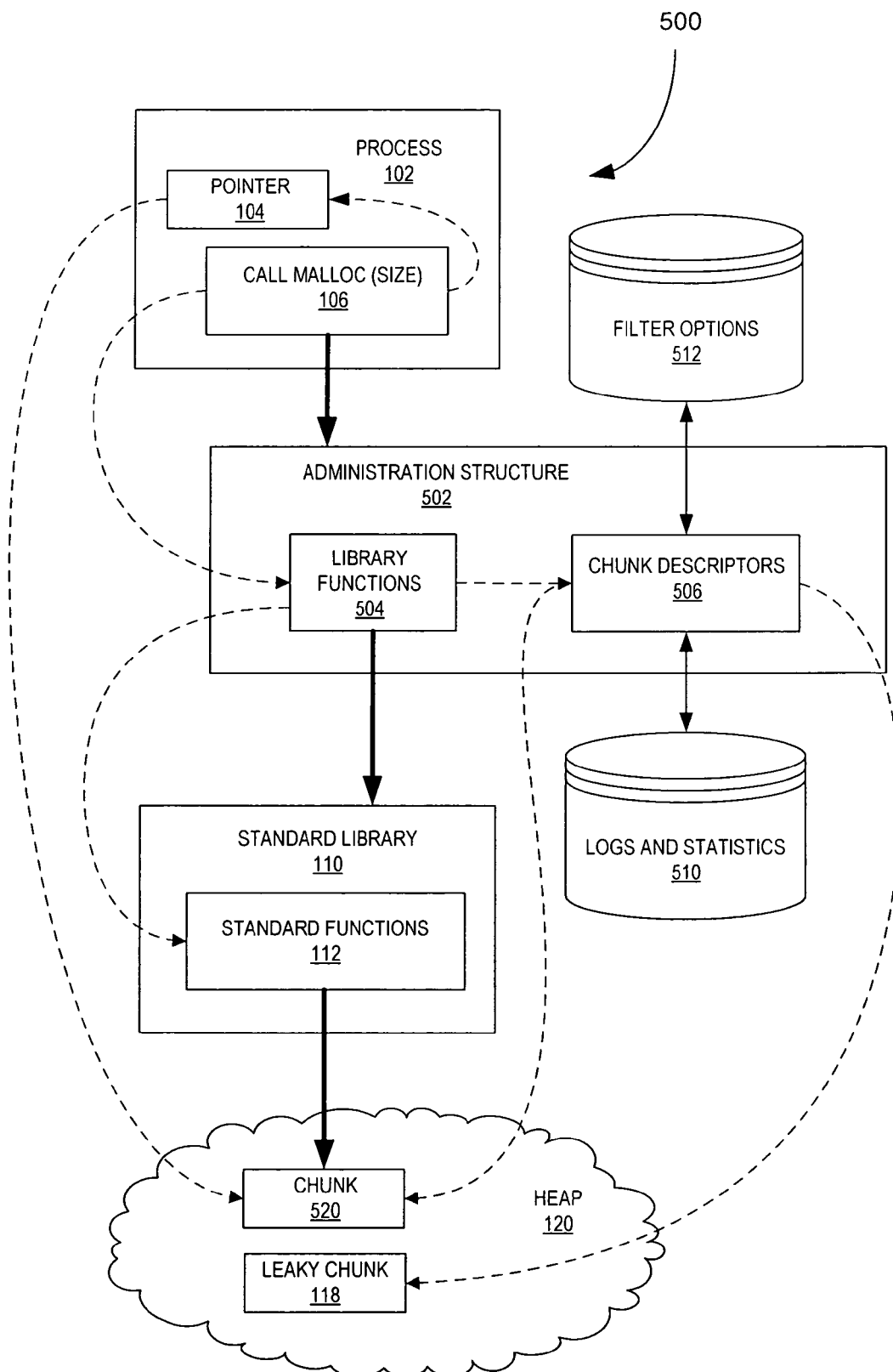
FIG. 7 is a schematic block diagram illustrating a system in which statistical information regarding allocated chunk size is generated and maintained during execution of a memory allocation function which causes a memory leak, in accordance with an example embodiment.

However, if the process 102 issues a further call to malloc 106 (FIG. 7), at block 328, the process 102 is consequently allocated a new chunk 520 in the heap 120, but as a reference to the newly allocated chunk 520 is assigned to the pointer 104, the reference to the previously allocated chunk 118 is lost. This results in a leaky chunk 118, at block 330. As illustrated in FIG. 7, the heap 120 in such case includes both the newly allocated chunk 520 and a leaky chunk 118. However, as there is no pointer or reference from the process 102 to the leaky chunk 118, it can no longer be used, but it can also not be freed. Repetition of the process which created the leaky chunk 118 will result in a growing number of leaky chunks. Because the chunk descriptor 506 associated with the leaky chunk 118 is not removed prior to allocation of the newly allocated chunk 520, while a new chunk descriptor 506 is written upon allocation of the new chunk 520, the administration structure 502 contains chunk descriptors 506 in respect of both the chunks 520 and 118. As the chunks 520 and 118 are of the same size, having been called by the same process 102, the statistics forming part of the logs and statistics 510 will reflect that the number of allocated chunks of that particular size has increased.

Figure 4:
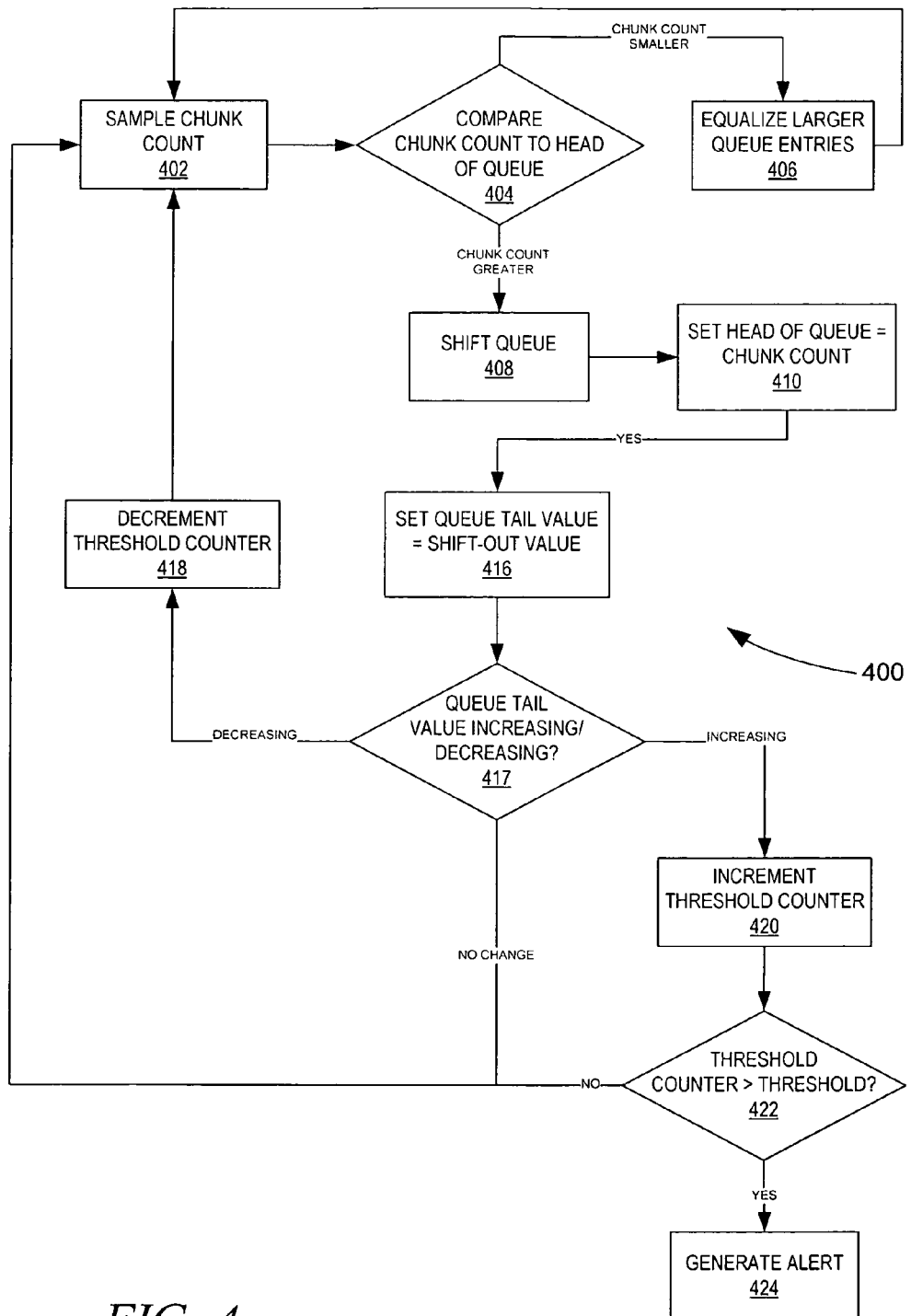
FIG. 4 is a schematic flow diagram of a method for monitoring statistical information regarding same-sized chunks for a particular chunk size, to detect a memory leak in a dynamic memory allocation process, according to an example embodiment.

FIG. 4 shows an example method 400 of monitoring statistics regarding allocated chunk size, to identify potential memory leaks. As explained and illustrated above with reference to FIGS. 5-7, memory leaks caused by repeated creation of leaky chunks in the heap 120 will result in a progressive growth in the number of chunks 118 having a particular size, which will be reflected in a corresponding growth in the number of chunk descriptors 506 of the particular size. To identify such a memory leak, the logs and statistics 510 provided by the memory administration application 200 may include a chunk count queue as exemplified in Table 1 below.

The method 400 comprises periodically sampling a chunk count, at block 402 (FIG. 4), to determine a current chunk count. Sampling of the chunk count comprises determining the number of allocated chunks 118 having a particular size. The chunk count queue may comprise a series of entries indicative of respective previously sampled chunk counts. After each sampling operation, the current chunk count is compared, at block 404, to a queue entry which forms a head of the queue, the head of the queue being the most recently entered entry in the chunk count queue. In the example embodiment of Table 1, the head of the queue is the leftmost entry.

If the current chunk count is smaller than the head of the queue, all entries in the queue which have a value larger than the current chunk are equalized, at block 406, in that these values larger than the current chunk count are set equal to the current chunk count. Such equalizing serves to smooth the chunk count queue, to compensate for oscillations in the growth of the chunk count over time, in order to reduce the possibility of false leak detection.

If, however, the current chunk count is greater than the head of the queue, the queue is shifted, at block 408, and the head of the queue is set equal to the current chunk count, at block 410.

Shifting of the queue means that each value in the queue is moved one entry further from the head of the queue towards a tail of the queue. The queue has a limited length, so that shifting of the queue may result in a value previously at the tail of the queue being shifted out of the queue. In the example embodiment described with reference to Table 1 below, the queue is right-shifted, with a rightmost value of the queue forming the tail of the queue.

After shifting of the queue, a Queue Tail Value or shift-out value is set equal to the value of the shifted out entry, at block 416. It will be appreciated that the value which formed the tail of the queue prior to shifting thus becomes the Queue Tail Value. Thereafter, it is determined, at block 417, whether the Queue Tail Value is increasing or decreasing. To this end, the newly set Queue Tail Value is compared to the previous Queue Tail Value. If there is no change in the Queue Tail Value, no further action is taken and the process awaits the next sampling operation, at block 402. If the Queue Tail Value is greater than the previous Queue Tail Value, i.e. the Queue Tail Value is increasing, a Threshold Counter or shift-out counter is incremented, at block 420. If, however, the Queue Tail Value is smaller than the previous Queue Tail Value, i.e. the Queue Tail Value is decreasing, then the Threshold Counter is decremented, at block 418.

Following incrementing of the Threshold Counter, it is determined, at block 422, whether or not the Threshold Counter exceeds a predetermined threshold value. If the threshold value is exceeded, then a memory leak alert is generated, at block 424, to indicate an administrator that there is a potential memory leak.

An example of the method 400 of FIG. 4 will now be described with reference to Table 1, which illustrates an example chunk count queue, Queue Tail Values, and shift out counter values. The chunk count queue of Table 1 is generated based on the example chunk count values illustrated in graph form in FIG. 8. The graph 800 of FIG. 8 shows a series of chunk count values sampled at ten second intervals, ranging from t1 to t15.

TABLE 1

| Sample | Current Chunk Count | Queue Entries | | | | | | | | | | Queue Tail Value | Threshold Counter |
|---|---|---|---|---|---|---|---|---|---|---|---|---|---|
| t1  | 4  | 4  | 0  | 0 | 0 | 0 | 0 | 0 | 0 | 0 | 0 | 0 | 0 |
| t2  | 7  | 7  | 4  | 0 | 0 | 0 | 0 | 0 | 0 | 0 | 0 | 0 | 0 |
| t3  | 3  | 3  | 3  | 0 | 0 | 0 | 0 | 0 | 0 | 0 | 0 | 0 | 0 |
| t4  | 3  | 3  | 3  | 0 | 0 | 0 | 0 | 0 | 0 | 0 | 0 | 0 | 0 |
| t5  | 5  | 5  | 3  | 3 | 0 | 0 | 0 | 0 | 0 | 0 | 0 | 0 | 0 |
| t6  | 10 | 10 | 5  | 3 | 3 | 0 | 0 | 0 | 0 | 0 | 0 | 0 | 0 |
| t7  | 12 | 12 | 10 | 5 | 3 | 3 | 0 | 0 | 0 | 0 | 0 | 0 | 0 |
| t8  | 8  | 8  | 8  | 5 | 3 | 3 | 0 | 0 | 0 | 0 | 0 | 0 | 0 |
| t9  | 8  | 8  | 8  | 5 | 3 | 3 | 0 | 0 | 0 | 0 | 0 | 0 | 0 |
| t10 | 12 | 12 | 8  | 8 | 5 | 3 | 3 | 0 | 0 | 0 | 0 | 0 | 0 |
| t11 | 16 | 16 | 12 | 8 | 8 | 5 | 3 | 3 | 0 | 0 | 0 | 0 | 0 |
| t12 | 13 | 13 | 12 | 8 | 8 | 5 | 3 | 3 | 0 | 0 | 0 | 0 | 0 |

Figure 8:
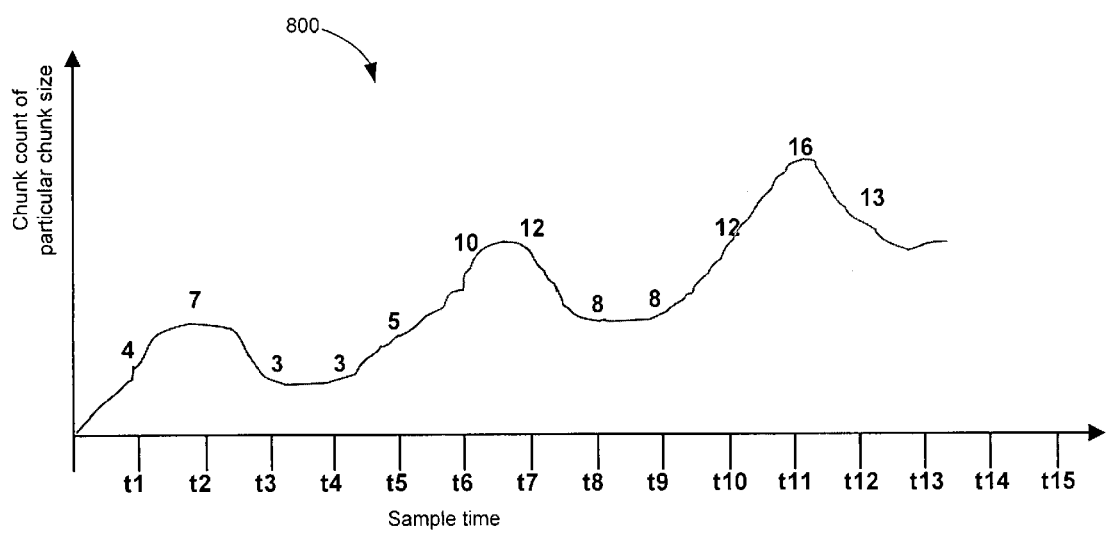
FIG. 8 is an example graph which plots the time progression of the number of chunks of a particular size allocated to a memory heap during dynamic memory allocation.

The example data set illustrated in FIG. 8 and presented in Table 1 does not represent a memory leak, even though the number of identically sized chunks increases from t1 to t15. It will be appreciated that such natural growth in identically sized chunks is often typical during start-up of a process. The queue length, therefore serves to smooth the queue and provide a lead-in period during which same sized chunk growth does not trigger a leak alert signal. In the example of Table 1, no values are shifted out of the queue, so that neither the Queue Tail Value nor the Threshold Counter is incremented. If the process does indeed generate a memory leak, the number of same sized chunks will continue to grow and will eventually trigger a leak alert signal. Typically, a graph representative of a memory leak may include peaks and troughs or valleys, but the value of the peaks will get progressively greater. An example of a chunk count queue registering a memory leak is provided below with reference to Table 2.

Nevertheless, it will be noted with reference to Table 1 that, at, sample time t2, the current check count value (7) is greater than the value of the head of the queue (4), resulting in right-shifting of the queue, in accordance with operation 416 in the method of FIG. 4, and further resulting in setting the head of the queue equal to the current chunk count value (7), in accordance with operation 410 in the method of FIG. 4. These operations are repeated at sample times t5, t6, t7, t10, and t11.

Further, at sample time t8 the current chunk count (8) is smaller than the head of the queue (12), and all queue entries larger than the current chunk count (12, 10) are thus set equal to the current chunk count (8), in accordance with operation 406 in the method of FIG. 4. The same applies to sample times t3 and t12.

As mentioned above, Table 2 illustrates a chunk count queue, a Queue Tail Value, and a shift out counter in the case of a memory leak.

In the example chunk count queue of Table 2, the queue length is again 10 chunk count entries, the sampling period is 10 seconds, and the threshold value for the Threshold Counter is 3. As can be seen from Table 2, an increase in the Queue Tail Value, i.e. the value of queue entry shifted out of the queue, results in incrementing of the Threshold Counter. For example, at sample time t42 a chunk count value of 3 is a shifted out of the queue, resulting in increase in the Queue Tail Value from 0 to 3. As a result, the Threshold Counter is incremented from 0 to 1, corresponding to operation 420 in the method 400 illustrated in FIG. 4. These operations are repeated at t43, t45, t47, and t48.

In contrast, if the Queue Tail Value were to decrease due to the value shifted out of the queue is smaller than the previously shifted out value, the Threshold Counter value will be decremented, corresponding to operation 418 of the method 400 (FIG. 4). For example, if the chunk count value at t46 in Table 2 was 9, all the chunk count entries in the queue would be set to 9. If, thereafter, the chunk count value at t47 was greater than 9, a value shifted out at the tail of the queue would be 9, so that the Queue Tail Value would decrease from 10 to 9. This would result in decrementing of the Threshold Counter from 3 to 2.

When, in the example of Table 2, the Threshold Counter is incremented at sample time t47, the Threshold Counter exceeds the threshold value (3), and a leak alert signal is generated, corresponding to operation 424 of the method 400 of FIG. 4. In this example, the leak alert signal triggers generation of an alert message for the attention of a system administrator, to indicate that the system 500 (FIGS. 5-7) may potentially be experiencing a memory leak.

The alert message may include information regarding the particular size of the chunks identified as forming part of the memory leak. An administrator may, in response, monitor further calls to malloc, and may identify the originator of leaky chunks as the output of a C-callstack during the next call to malloc for the allocation of memory with the particular size of the leaky chunks.

TABLE 2

| Sample | Chunk Count | Queue Entries | | | | | | | | | | Queue Tail Value | Threshold Counter |
|---|---|---|---|---|---|---|---|---|---|---|---|---|---|
| t41 | 38 | 38 | 35 | 28 | 22 | 20 | 16 | 10 | 10 | 5  | 3  | 0  | 0 |
| t42 | 41 | 41 | 38 | 35 | 28 | 22 | 20 | 16 | 10 | 10 | 5  | 3  | 1 |
| t43 | 45 | 45 | 41 | 38 | 35 | 28 | 22 | 20 | 16 | 10 | 10 | 5  | 2 |
| t44 | 43 | 43 | 41 | 38 | 35 | 28 | 22 | 20 | 16 | 10 | 10 | 5  | 2 |
| t45 | 48 | 48 | 43 | 41 | 38 | 35 | 28 | 22 | 20 | 16 | 10 | 10 | 3 |
| t46 | 55 | 55 | 48 | 43 | 41 | 38 | 35 | 28 | 22 | 20 | 16 | 10 | 3 |
| t47 | 57 | 57 | 55 | 48 | 43 | 41 | 38 | 35 | 28 | 22 | 20 | 16 | 4 |

The parameters relating to such an identification of potential memory leaks may be adjusted by an administrator via the monitoring parameter module 210. It will be appreciated that different programs or processes can display different same sized chunk count behavior, and that a set of parameters which may result in correct identification of a memory leak in one program may result in false alerts in another program. The monitoring parameters may thus be adjusted to distinguish between valid same-sized chunk growth and leaks.

Sensitivity of leak detection, for example, has an inverse relationship to the sample period or interval, so that a shorter sample period produces more sensitive monitoring. A default value for the sample interval or period may be 10 seconds. Further, some programs may experience a longer period of same sized chunk growth at start-up than other programs. To provide for smoothing of such valid initial same-sized chunk growth, an administrator may increase the length of the chunk count queue and/or may increase the sample period, so that the method described above provides a longer lead-in time or interval before shift-out from the queue commences. It will be appreciated that the lead-in period or initial smoothing period is provided by the length of the queue multiplied by the sampling interval or period. A default queue length of 10 entries, coupled with a 10 second default sample period, produces a 100 second smoothing period. The threshold value may likewise be adjusted, and will determine a minimum time interval within which they leak can be detected. For example, a threshold value of 10, coupled with a 10 second sampling interval and a queue length of 10 entries, results in a minimum time interval of 200 seconds after initialization before identification of a memory leak is possible.

The monitoring parameters described above may be altered by an administrator while the process 102 or program is running. In another embodiment, the monitoring parameter module 210 may be configured for automatic adjustment of at least some of the parameters. In such case, an alert message generated by the alert module 206 may prompt an administrator to indicate whether or not a memory leak was correctly identified. If input received from the administrator in response to the prompt indicates a false alert, the parameters may be automatically adjusted to reduce the sensitivity of the monitoring process. Such a monitoring system is therefore self-adjusting.

It is to be appreciated that the chunk count cues described with reference to Table 1 and Table 2 are in respect only of chunks of a particular size. However, memory allocation to a process or program is typically in respect of chunks of a number of different sizes, and the monitoring method 400 (FIG. 4) may thus be performed in respect of a number of different chunk sizes. For every chunk size allocated to the process 102, a corresponding chunk count queue may simultaneously be generated, maintained, and/or monitored.

A particular program may however, result in valid allocation of a large number of chunks of a particular size, or valid allocation of a continually increasing number of chunks of a particular size, without the occurrence of a memory leak. In such a case, an administrator may specify the filtering of information regarding chunks of that particular size, such filtering being implemented by the monitoring module 204 via the filter options 512 of FIG. 5. On the other hand, an administrator may wish to focus on the allocation of chunks of a specified size, in which case a focus size may be specified via the filter options 512. The method may thus include monitoring the allocation of same sized chunks for all relevant chunk sizes, for a subset of relevant chunk sizes, or for a particular selected chunk size only.

It will be appreciated that the described example method and system finds particular application in detecting memory leaks in systems where variable sized blocks or chunks are allocated from the memory heap and are accessed with a reference or pointer, as opposed to systems in which allocations from the memory heap are identified as objects, as is the case in certain Java implementations.

Figure 9:
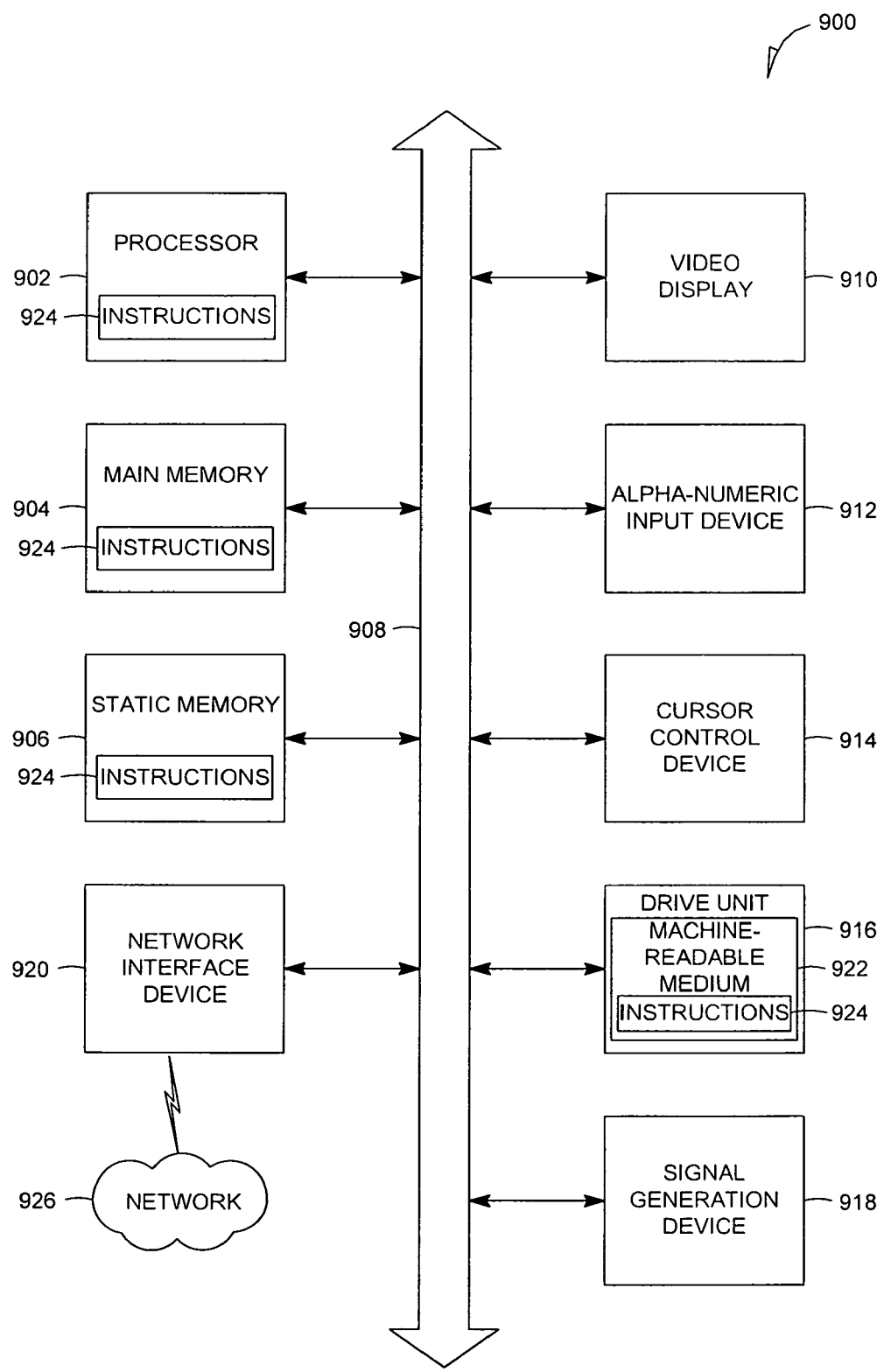
FIG. 9 is a block diagram of a machine in the example form of a computer system within which a set of instructions, for causing the machine to perform any one or more of the methodologies discussed herein, may be executed.

FIG. 9 shows a diagrammatic representation of a machine in the example form of a computer system 900, within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" or "computer-readable medium" shall be taken to include any tangible non-transitory medium which is capable of storing or encoding a sequence of instructions for execution by the machine and that causes the machine to perform any one of the methodologies, and shall be taken to include a single medium or multiple media (e.g., a centralized or distributed database, and/or associated caches and servers).

Thus, a method and system to detect memory leaks during dynamic memory allocation have been described. Although specific example embodiments have been described and illustrated, it will be evident that various modifications and changes may be made to these embodiments without departing from the broader spirit and scope of method and system. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   generating statistical information regarding allocated chunks in a memory heap during a dynamic memory allocation process, the statistical information including same-sized chunk information that is related to a number of allocated chunks being identical in size, and the same-size chunk information including a chunk count that corresponds to a total number of allocated chunks of a particular size;
   monitoring the statistical information to identify a potential memory leak based at least in part on the same-sized chunk information, the monitoring of the statistical information including tracking the chunk count over time; and
   generating an alert signal in response to an identification of the potential memory leak.

2. The method of claim 1, wherein the monitoring of the statistical information includes providing an initial lead-in time during which growth of the chunk count does not result in the generating of the alert signal.

3. The method of claim 1, further comprising:
   providing a chunk count queue comprising a series of chunk count entries;
   determining a current chunk count at regular intervals;
   if the current chunk count meets predetermined criteria, inserting the current chunk count at a head of the queue, and shifting a remainder of the queue towards a tail of the queue; and
   monitoring the tail of the queue to identify the potential memory leak.

4. The method of claim 3, further comprising comparing the current chunk count to the head of the queue, and inserting the current chunk count at the head of the queue if the current chunk count is greater than the head of the queue.

5. The method of claim 3, further comprising compensating for oscillation of the chunk count over time by smoothing the chunk count queue.

6. The method of claim 5, wherein smoothing the chunk count queue comprises comparing the current chunk count to the head of the queue, and if the current chunk count is smaller than the head of the queue, setting each chunk count entry that is greater than the current chunk count equal to the current chunk count.

7. The method of claim 3, wherein the chunk count queue has a limited length, so that shifting of the queue results in production of a shift-out value at the tail of the queue, the method further comprising incrementing a threshold counter in response to an increase in the shift-out value, the alert signal being automatically generated when the threshold counter exceeds a threshold value.

8. The method of claim 7, further comprising decrementing the threshold counter in response to a decrease in the shift-out value.

9. The method of claim 1, wherein generating the statistical information includes intercepting a standard memory allocation call from a process to a standard library, and recording a chunk descriptor indicative of a chunk size associated with the memory allocation call, the method further including intercepting a standard free memory call from the process to the standard library, and removing a previously recorded chunk descriptor associated with the free memory call.

10. The method of claim 1, further comprising:
    adjusting at least one monitoring parameter used in monitoring of the statistical information to identify the potential memory leak.

11. The method of claim 1, wherein identifying the potential memory leak includes comparing chunk-count values based on tracking the chunk count over time with a threshold value that identifies the potential memory leak.

12. A system comprising at least one computer configured to perform operations for computer-implemented modules including:
    a statistics module to generate statistical information regarding allocated chunks in a memory heap during a dynamic memory allocation process in a computer system, the statistical information including same-sized chunk information that is related to a number of allocated chunks being identical in size, and the same-size chunk information including a chunk count that corresponds to a total number of allocated chunks of a particular size;
    a monitoring module to monitor the statistical information to identify a potential memory leak based at least in part on the same-sized chunk information, the monitoring of the statistical information including tracking the chunk count over time; and
    an alert module to generate an alert signal in response to an identification of the potential memory leak.

13. The system of claim 12, wherein the monitoring module is configured to provide an initial lead-in time during which growth of the chunk count does not trigger identification of the potential memory leak.

14. The system of claim 12, wherein the monitoring module is further configured to:
    provide a chunk count queue comprising a series of chunk count entries;
    determine a current chunk count at regular intervals;
    if the current chunk count meets predetermined criteria, insert the current chunk count at a head of the chunk count queue, and shift the remainder of the queue towards a tail of the queue; and
    monitor the tail of the queue to identify the potential memory leak.

15. The system of claim 14, wherein the monitoring module is configured to compare the current chunk count to the head of the queue, and is configured to insert the current chunk count at the head of the queue if the current chunk count is greater than the head of the queue.

16. The system of claim 14, wherein the monitoring module is configured to compensate for oscillation of the chunk count over time by smoothing the chunk count queue.

17. The system of claim 16, wherein the monitoring module is configured to smooth the chunk count queue by comparing the current chunk count to the head of the queue, and if the current chunk count is smaller than the head of the queue, setting each chunk count entry that is greater than the current chunk count equal to the current chunk count.

18. The system of claim 14, wherein the chunk count queue has a limited length, so that shifting of the queue results in production of a shirt-out value at the tail of the queue, the monitoring module being further configured to increment a threshold counter in response to an increase in the shift-out value, and automatically to identify a potential memory leak when the threshold counter exceeds a threshold value.

19. The system of claim 18, wherein the monitoring module is further configured to decrement the threshold counter in response to a decrease in the shift-out value.

20. The system of claim 12, wherein the statistics module is configured to intercept a standard memory allocation call from a process to a standard library, and to record a chunk descriptor indicative of a chunk size associated with the memory allocation call, the statistics module being further configured to intercept a standard free memory call from the process to the standard library, and to remove a previously recorded chunk descriptor associated with the free memory call.

21. The system of claim 12, further comprising:
    a parameter module configured to permit administrator adjustment of at least one monitoring parameter used by the monitoring module to identity a potential memory leak.

22. The system of claim 12, wherein the monitoring module is configured to compare chunk-count values based on tracking the chunk count over lime with a threshold value that identifies the potential memory leak.

23. A non-transitory machine-readable storage medium storing instructions that, when performed by a machine, cause the machine to:
    generate statistical information regarding allocated chunks in a memory heap during a dynamic memory allocation process, the statistical information including same-sized chunk information that is related to a number of allocated chunks being identical in size, and the same-size chunk information including a chunk count that corresponds to a total number of allocated chunks of a particular size;
    monitor the statistical information to identify a potential memory leak based at least in part on the same-sized chunk information, the monitoring of the statistical information including tracking the chunk count over time; and
    generate an alert signal in response to an identification of the potential memory leak.

24. A system comprising at least one computer configured to perform operations for computer-implemented modules including:
    means for generating statistical information regarding allocated chunks in a memory heap during a dynamic memory allocation process, the statistical information including same-sized chunk information that is related to a number of allocated chunks being identical in size, and the same-size chunk information including a chunk count that corresponds to a total number of allocated chunks of a particular size;
    means for monitoring the statistical information to identify a potential memory leak based at least in part on the same-sized chunk information, the monitoring of the statistical information including tracking the chunk count over time; and
    means for generating an alert signal in response to an identification of the potential memory leak.

* * * * *